(12) United States Patent
Liao

(10) Patent No.: US 9,334,058 B2
(45) Date of Patent: May 10, 2016

(54) PRE-DEPLOYED PARACHUTE

(71) Applicant: Shueh-Chih Liao, Taichung (TW)

(72) Inventor: Shueh-Chih Liao, Taichung (TW)

( * ) Notice: Subject to any disclaimer, the term of this patent is extended or adjusted under 35 U.S.C. 154(b) by 136 days.

(21) Appl. No.: 14/321,220

(22) Filed: Jul. 1, 2014

(65) Prior Publication Data

US 2016/0001887 A1 Jan. 7, 2016

(51) Int. Cl.
*B64D 17/02* (2006.01)
*B64D 17/24* (2006.01)

(52) U.S. Cl.
CPC ............... *B64D 17/02* (2013.01); *B64D 17/24* (2013.01)

(58) Field of Classification Search
CPC ........ B64D 17/00; B64D 17/02; B64D 17/04; B64D 17/14; B64D 17/62; B64D 17/64; B64D 17/68; B64D 17/72; B64D 17/74
USPC .......................... 244/142, 145, 146, 147, 149
See application file for complete search history.

(56) References Cited

U.S. PATENT DOCUMENTS

| | | | | |
|---|---|---|---|---|
| 3,154,268 A | * | 10/1964 | Struble, Jr. ................ | B64B 1/40 244/142 |
| 3,385,539 A | * | 5/1968 | Ewing ...................... | B64D 1/00 244/142 |
| 4,105,173 A | * | 8/1978 | Bucker .................. | B64D 17/72 182/3 |
| 2005/0040290 A1 | * | 2/2005 | Suhami .................. | B64D 17/66 244/146 |
| 2008/0149774 A1 | * | 6/2008 | Giles ...................... | B64D 17/74 244/142 |

* cited by examiner

*Primary Examiner* — Christopher P Ellis
*Assistant Examiner* — Richard G Davis
(74) *Attorney, Agent, or Firm* — Shia Banger

(57) ABSTRACT

A pre-deployed parachute includes a double-drag balloon parachute with an inflation canopy and a first drag generating space, a universal joint attached to the double-drag balloon parachute by a universal joint, a pre-deployed canopy with a second drag generating space and attached to the universal joint, a load attached to the pre-deployed canopy. The inflation of the inflation canopy allows the pre-deployed canopy to be deployed without requiring height difference and any dynamic energy. With the buoyancy and the first drag generated by the double-drag balloon parachute and the second drag generated by the pre-deployed canopy, the pre-deployed parachute is capable of producing three drag forces, and therefore, the pre-deployed parachute can be brought to a stable condition within a very short time, which prevents the discomfort feeling of a sudden free fall at the beginning stage of the parachuting.

7 Claims, 6 Drawing Sheets

PRE-DEPLOYED PARACHUTE

BACKGROUND OF THE INVENTION

1. Field of the Invention

The present invention relates to a parachute, and more particularly to a pre-deployed parachute.

2. Description of the Prior Art

A parachute is a device used to slow the motion of an object through an atmosphere by creating drag. There are many types of parachutes, among them, the free-fall parachute and drogue parachute all require enough height or space to deploy, and therefore are not suitable for use when the take-off location is on the buildings which cannot provide enough height and space.

Therefore, a balloon parachute 10 was invented, as shown in FIG. 1, which is a double layer structure comprised of an air drag canopy 11 and an inflation balloon 12 which is connected to the air drag canopy 11 by a plurality of first cords 13, in a manner that the first cords 13 have one ends fixed to the inflation balloon 12 and another ends fixed to the edge of the air drag canopy 11. To the air drag canopy 11 is attached a load 15.

When the balloon parachute 10 falls from high altitude, the inflation balloon 12 provides buoyancy to insure the balloon parachute 10 has enough time to inflate, and the air drag canopy 11 provides drag to slow the fall of the balloon parachute 10. However, the inflation balloon 12 has to be large enough to provide sufficient buoyancy, otherwise it will be unable to provide enough buoyancy if it is too small. Or if the diameter of the air drag canopy 11 is several times the diameter of the inflation parachute 12, the balloon parachute 10 will take an overly long time to inflate, and is therefore not suitable for use for emergency escape. The balloon parachute 10 will become too large and heavy if the inflation balloon 12 is large.

The present invention has arisen to mitigate and/or obviate the afore-described disadvantages.

SUMMARY OF THE INVENTION

The primary objective of the present invention is to provide a pre-deployed parachute, which is free of the disadvantage of the conventional balloon parachute that large buoyancy always comes with a large size and poor transportation performance of the parachute.

To achieve the above objective, a pre-deployed parachute in accordance with the present invention comprises: a double-drag balloon parachute, a universal joint, a pre-deployed canopy, and a load.

The double-drag balloon parachute is a symmetrical structure which is symmetrical with respect to a central axis and comprising an inflation canopy which defines a first drag generating space. The inflation canopy is provided with an inner inflation space and a valve in communication with the inner inflation space. The inflation canopy includes a peripheral wall which defines the first drag generating space, and the first drag generating space includes a first open end.

The universal joint is attached to the double-drag balloon parachute by a plurality of first cords, the first cords each have one end fixed to one end of the universal joint, and another end fixed to the double-drag balloon parachute, so that the double-drag balloon parachute is able to rotate with respect to the universal joint.

The pre-deployed canopy includes an arc-shaped top surface and an annular peripheral surface which defines a second drag generating space, the arc-shaped top surface is attached to a first end of the annular peripheral surface, and the second drag generating space have a second open end located at a second end of the annular peripheral surface. The pre-deployed canopy is attached to another end of the universal joint by a plurality of second cords which each have one end fixed to the pre-deployed canopy and another end fixed to the another end of the universal joint, so that the pre-deployed canopy is able to rotate with respect to the pre-deployed canopy.

The load is attached to the pre-deployed canopy by a plurality of third cords which each have one end fixed to the pre-deployed canopy and another end fixed to the load.

The inflation of the inflation canopy allows the pre-deployed canopy to be deployed without requiring height difference and any dynamic energy, and therefore is suitable for use at the high altitude in a limited space, which eliminates the possibilities of deployment failure, thus considerably improving safety. With the buoyancy and the first drag generated by the double-drag balloon parachute and the second drag generated by the pre-deployed canopy, the pre-deployed parachute of the present invention is capable of producing three drag forces, and therefore, the pre-deployed parachute of the present invention can be brought to a stable condition within a very short time, which prevents the discomfort feeling of a sudden free fall at the beginning stage of the parachuting.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 2-5, a pre-deployed parachute in accordance with a preferred embodiment of the present invention comprises: a double-drag balloon parachute 20, a universal joint 30, a pre-deployed canopy 50, and a load 70.

Figure 1:
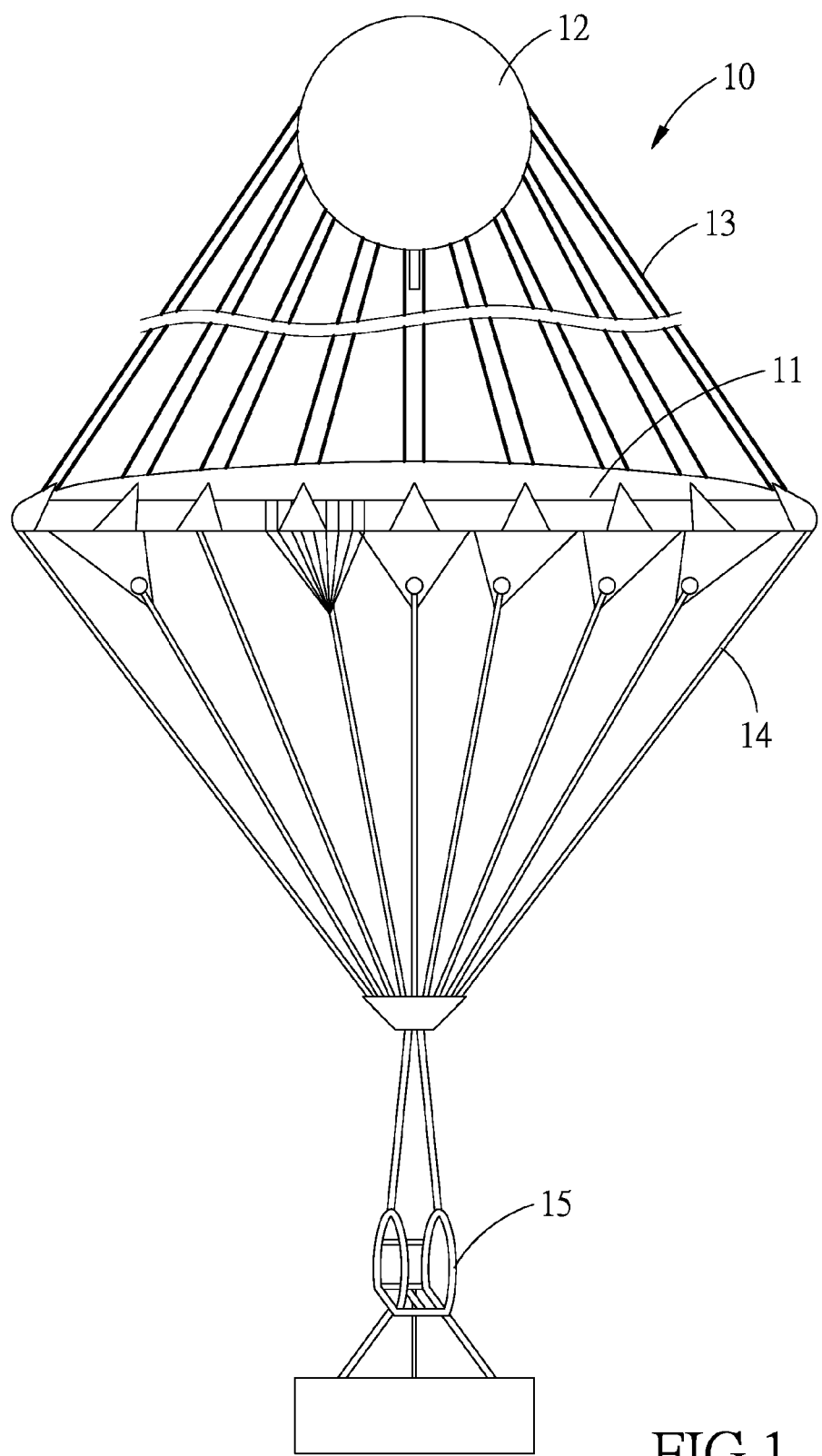
FIG. 1 shows a conventional balloon parachute.
Figure 2:
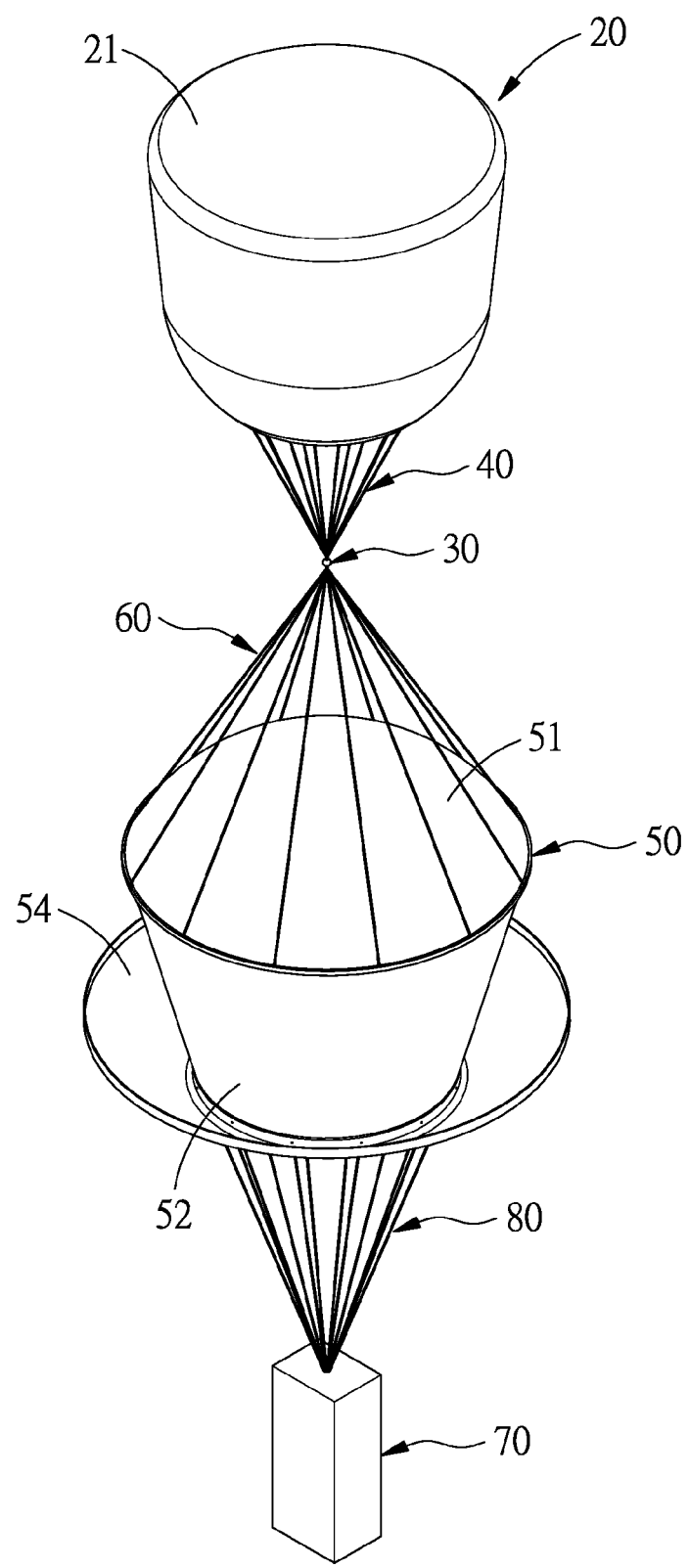
FIG. 2 is a perspective view of a pre-deployed parachute in accordance with a preferred embodiment of the present invention.
Figure 3A:
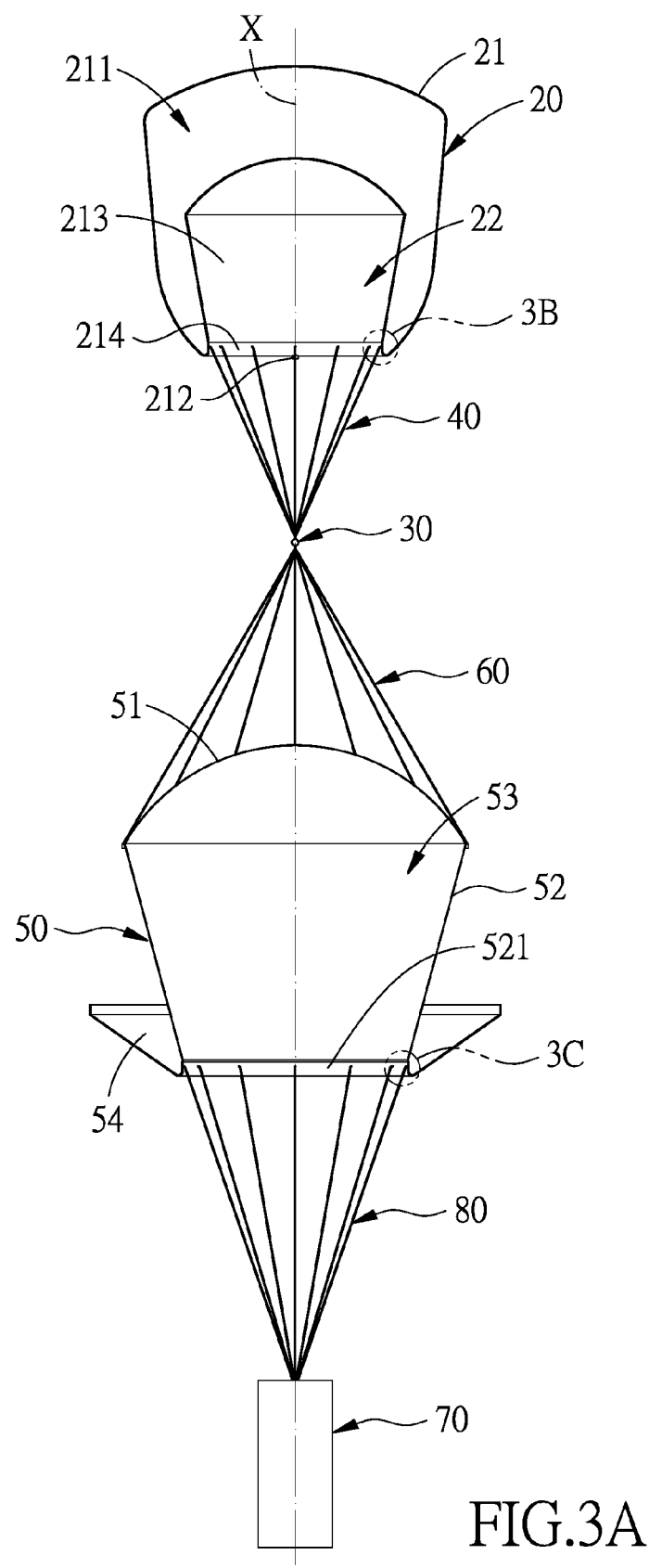
FIG. 3A is a cross sectional view of the pre-deployed parachute in accordance with the present invention.
Figure 3B:
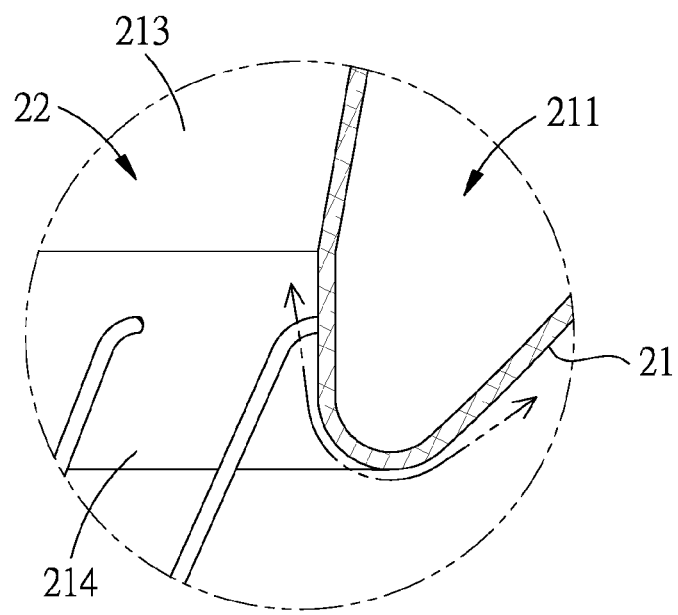
FIG. 3B is an enlarged view of a part of the pre-deployed parachute in accordance with the present invention.

The double-drag balloon parachute 20 is a symmetrical structure which is symmetrical with respect to a central axis X and comprises an inflation canopy 21 which defines a first drag generating space 22. The inflation canopy 21 is a hollow structure made of flexible material and formed with an inner inflation space 211. The inflation canopy 21 is provided with a valve 212 in communication with the inner inflation space 211. The inflation canopy 21 includes a peripheral wall 213 which defines the first drag generating space 22. The first drag generating space 22 includes a first open end 214 which is made of rigid material, arc-shaped and located at the free end of the peripheral wall 213, as shown in FIG. 3B.

The universal joint 30 is attached to the double-drag balloon parachute 20 by a plurality of first cords 40. The first cords 40 each have one end fixed to one end of the universal joint 30, and another end fixed to the first open end 214 of the double-drag balloon parachute 20, so that the double-drag balloon parachute 20 is able to rotate with respect to the universal joint 30.

Figure 3C:
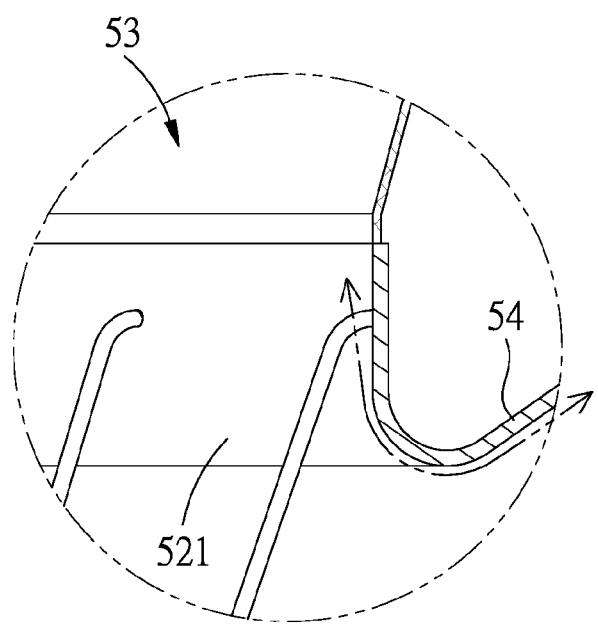
FIG. 3C is an enlarged view of a part of the pre-deployed parachute in accordance with the present invention.

The pre-deployed canopy 50 includes an arc-shaped top surface 51 and an annular peripheral surface 52 which defines a second drag generating space 53. The arc-shaped top surface 51 and the annular peripheral surface 52 are made of flexible material. The arc-shaped top surface 51 is attached to a first end of the annular peripheral surface 52, and the second drag generating space 53 has a second open end 521 located at a second end of the annular peripheral surface 52. The second open end 521 is made of inflexible material, and the edge of the second open end 521 is arc-shaped, as shown in FIG. 3C. The first end of the annular peripheral surface 52 is larger in diameter than the second end, and the second end of the annular peripheral surface 52 is further connected to an annular wing portion 54 which extends at an angle with respect to the central axis X. In this embodiment, the annular wing portion 54 is an annular tapered piece extending outward from the annular peripheral surface 52 and tapered toward the double-drag balloon parachute 20, and the annular wing portion 54 is made of inflexible rigid material. The pre-deployed canopy 50 is attached to another end of the universal joint 30 by a plurality of second cords 60 which each have one end fixed to the arc-shaped top surface 51 and another end fixed to the another end of the universal joint 30, so that the pre-deployed canopy 50 is able to rotate with respect to the universal joint 30.

The load 70 is attached to the pre-deployed canopy 50 by a plurality of third cords 80 which each have one end fixed to the second open end 521 and another end fixed to the load 70.

Figure 4:
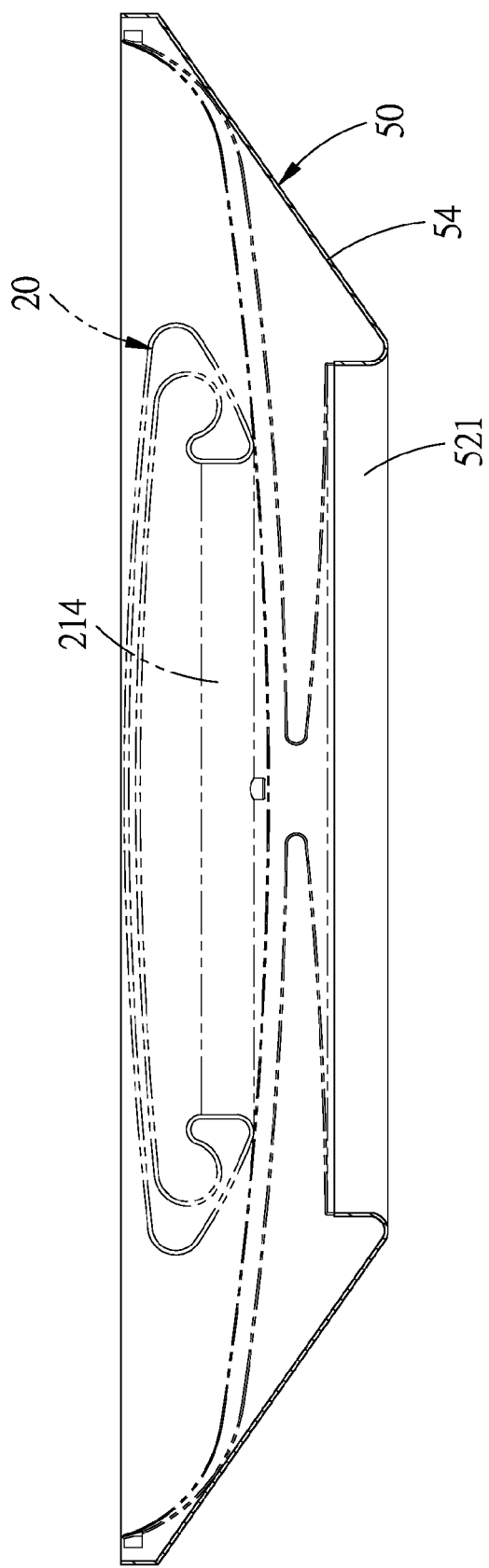
FIG. 4 shows that folded status of the pre-deployed parachute in accordance with the present invention.

The inflation canopy 21, and the arc-shaped top surface 51 and annular peripheral surface 52 of the pre-deployed canopy 50, when not in use, can be folded into a compact size as shown in FIG. 4, since they are made of flexible material. The wing portion 54 is made of rigid material, so it can be used as a container for holding the folded canopies.

When in use, the parachute of the present invention is firstly placed at a high place or the top of a building, then gas (which is preferably helium) lighter than air is put into the inner inflation space 211 of the inflation canopy 21 by the valve 212.

Figure 5:
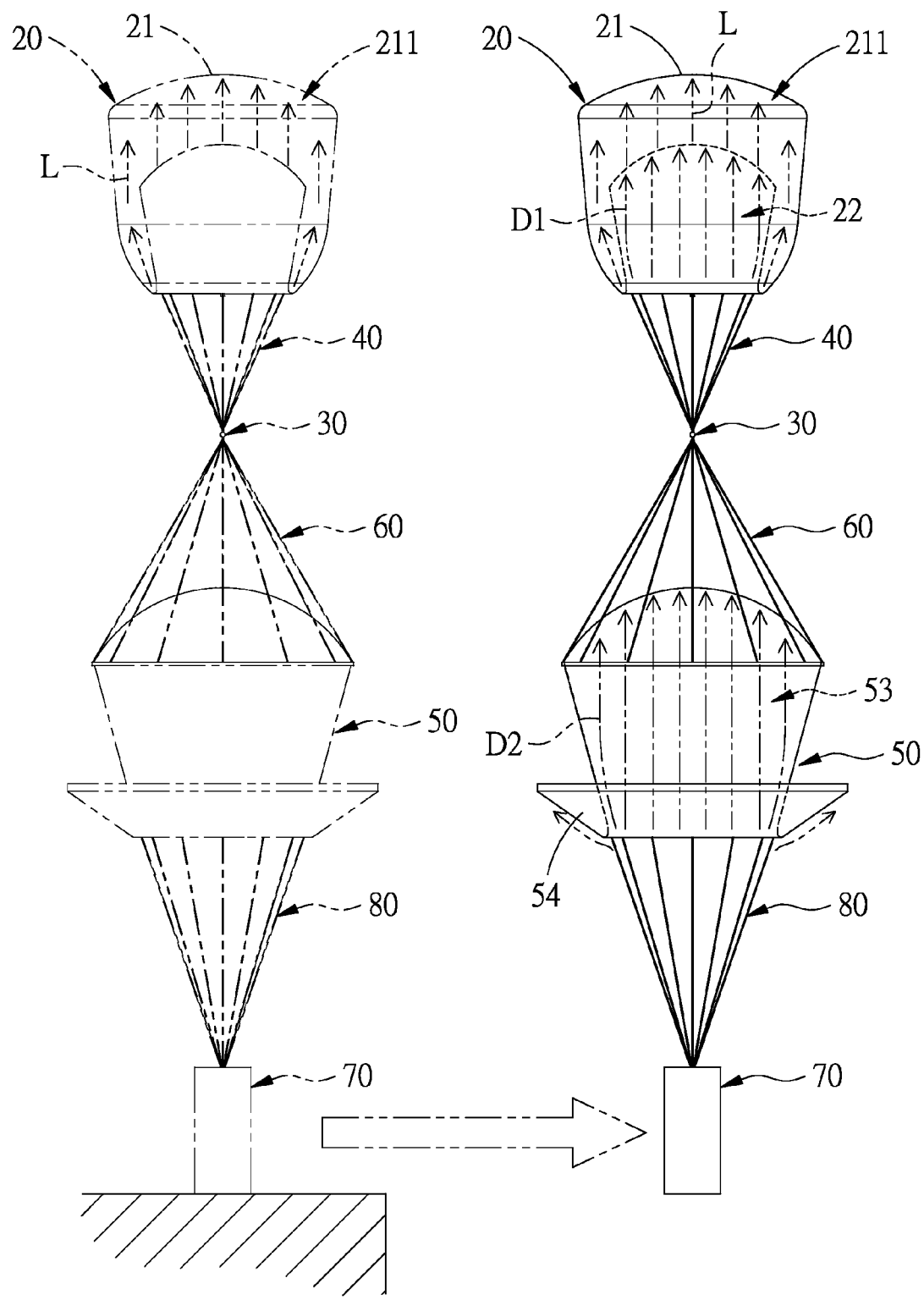
FIG. 5 is an operational view of the pre-deployed parachute in accordance with the present invention.

The gas inside the inner inflation space 211 produces a buoyancy L to make the double-drag balloon parachute 20 rise, which then causes the rise of the first cords 40, the universal joint 30 and the second cords 60, and finally the rise and deployment of the pre-deployed canopy 50. Hence, the pre-deployed canopy 50 can be deployed without requiring height difference and any dynamic energy. Then, the parachute after being deployed can be moved to a take-off position and falls from the height, as shown in FIG. 5.

When the pre-deployed parachute of the present invention falls from high altitude, the gas inside the inner inflation space 211 produces a buoyancy L, at the same time, ambient air rushes into the first and second drag generating spaces 22, 53 to produce a first drag D1 and a second drag D2. With the buoyancy L and the first drag D1 generated by the double-drag balloon parachute 20 and the second drag D2 generated by the pre-deployed canopy 50, the pre-deployed parachute of the present invention is capable of producing three drag forces, and the sum of the three drag forces is larger than the weight of the parachute and the load. Therefore, the pre-deployed parachute of the present invention can be brought to a stable condition within in a very short time, which prevents the discomfort feeling of a sudden free fall at the beginning stage of the parachuting or even injuries caused by an overly fast deployment of the conventional parachute.

It is to be noted that, the air has to pass through the first and second open ends 214, 521 before moving into the first and second drag generating spaces 22, 53, and the first and second open ends 214, 521 are made of rigid material, which can prevent the problem of vibration of the soft material. The arc-shaped structure creates an air distribution and stratification, allowing the air to smoothly flow into the first and second drag generating spaces 22, 53, and allowing the air which does not flow into the first and second drag generating spaces 22, 53 to flow smoothly off of the parachute.

The gas inside the inner inflation space 211 produces a buoyancy L to cause deployment of the pre-deployed canopy 50. Hence, the pre-deployed canopy 50 can be deployed without requiring height difference and any dynamic energy, and therefore is suitable for use at the high altitude in a limited space (such as the high buildings in the city). Furthermore, the method of automatic deployment by the inflation of the double-drag balloon parachute 20 eliminates the possibilities of deployment failure, thus considerably improving safety.

The universal joint 30 between the double-drag balloon parachute 20 and the pre-deployed canopy 50 allows free rotation of the double-drag balloon parachute 20 and the pre-deployed canopy 50. Namely, when the parachute sways during descent, the freedom of rotation can break the connection of the straight pulling force and the rotation torque between the double-drag balloon parachute 20 and the pre-deployed canopy 50, which consequently insures a steady descent of the parachute.

The annular wing portion 54 extends at an angle with respect to the X axis and is a tapered structure with a drag coefficient of 0.5, therefore, it can deflect air flow while reducing turbulence, which consequently improves the stability of the parachute.

It is clear from the above description that the pre-deployed parachute of the present invention is easy for storage when it is not in use. The inflation of the inflation canopy 21 can make the pre-deployed canopy to rise and cause deployment of the pre-deployed canopy 50. Hence, the pre-deployed canopy 50 can be deployed without requiring height difference and any dynamic energy, and therefore is suitable for use at the high altitude in a limited space (such as the high buildings in the city). Furthermore, the method of automatic deployment by the inflation of the double-drag balloon parachute 20 eliminates the possibilities of deployment failure, thus considerably improving safety.

While we have shown and described various embodiments in accordance with the present invention, it is clear to those skilled in the art that further embodiments may be made without departing from the scope of the present invention.

What is claimed is:

1. A pre-deployed parachute comprising:
   a double-drag balloon parachute being a symmetrical structure which is symmetrical with respect to a central axis and comprising an inflation canopy which defines a first drag generating space, the inflation canopy being formed with an inner inflation space, the inflation canopy is provided with a valve in communication with the inner inflation space, the inflation canopy including a peripheral wall which defines the first drag generating space, the first drag generating space including a first open end;

a universal joint attached to the double-drag balloon parachute by a plurality of first cords, the first cords each having one end fixed to one end of the universal joint, and another end fixed to the double-drag balloon parachute, so that the double-drag balloon parachute is able to rotate with respect to the universal joint;

a pre-deployed canopy including an arc-shaped top surface and an annular peripheral surface which defines a second drag generating space, the arc-shaped top surface being attached to a first end of the annular peripheral surface, and the second drag generating space having a second open end located at a second end of the annular peripheral surface, the pre-deployed canopy being attached to another end of the universal joint by a plurality of second cords which each have one end fixed to the pre-deployed canopy and another end fixed to the another end of the universal joint, so that the pre-deployed canopy is able to rotate with respect to the universal joint; and a load attached to the pre-deployed canopy by a plurality of third cords which each have one end fixed to the pre-deployed canopy and another end fixed to the load.

2. The pre-deployed parachute as claimed in claim 1, wherein the inflation canopy, and the arc-shaped top surface and annular peripheral surface of the pre-deployed canopy are made of flexible material.

3. The pre-deployed parachute as claimed in claim 1, wherein the first and second open ends are made of rigid material.

4. The pre-deployed parachute as claimed in claim 1, wherein the first cords each have one end fixed to one end of the universal joint, and another end fixed to the first open end, the second cords each have one end fixed to the arc-shaped top surface and another end fixed to the another end of the universal joint, and the third cords each have one end fixed to the second open end and another end fixed to the load.

5. The pre-deployed parachute as claimed in claim 1, wherein the second end of the annular peripheral surface is further connected to an annular wing portion which extends at an angle with respect to the central axis and is made of inflexible rigid material.

6. The pre-deployed parachute as claimed in claim 5, wherein the annular wing portion is an annular tapered piece extending outward from the annular peripheral surface and tapered toward the double-drag balloon canopy.

7. The pre-deployed parachute as claimed in claim 1, wherein the first end of the annular peripheral surface is larger in diameter than the second end.

\* \* \* \* \*